May 8, 1962 R. B. OLSEN 3,033,201
BANDAGE
Filed Nov. 13, 1956
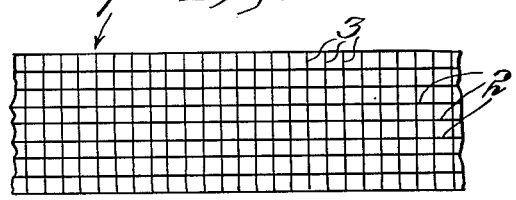
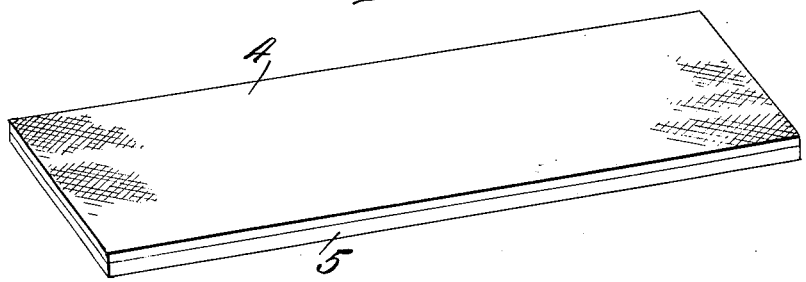
INVENTOR.
RAYMOND B. OLSEN
BY
ATTORNEY

United States Patent Office 3,033,201
Patented May 8, 1962

3,033,201
BANDAGE
Raymond B. Olsen, Newark, N.J., assignor to Medical Fabrics Co., Inc., Paterson, N.J., a corporation of New Jersey
Filed Nov. 13, 1956, Ser. No. 621,877
1 Claim. (Cl. 128—156)

The present invention deals with an elastic bandage and more particularly with a coated elastic bandage.

The fabric from which elastic bandages are usually manufactured is provided by a weaving process and in the form of a woven strip or a woven sheet which may be slit to provide appropriately dimensioned strips for use as bandages or dressings.

The strips are usually rendered longitudinally elastic by the provision of non-elastic woof strands and elastic warp stands such as high twist yarn, or loosely woven warp strands supplemented by rubber warp strands, or loosely woven woof and warp stands covered by a layer of latex or synthetic rubber, etc.

Although such elastic bandages as heretofore known are satisfactory for various applications, they are deficient either in the degree of elasticity or in other respects. For example, rubber coated fabric or rubber supplemental warp strands, although having suitable elasticity, require a substantially high stretching force and consequently possess a substantially high contractile force which may result in an undesirably high constriction over the area to which the bandage is applied.

Bandages comprising elastic warp strands such as high twist yarn are less elastic than rubber strands but are more desirable since the contractile force of the warp strands is less than that of rubber warp strands and the danger of undesirable constriction is thereby substantially avoided. Although such type bandages are satisfactory, there is the possibility that the windings of the bandage upon itself over the area to which the bandage is applied may result in a slippage of the winding turns due to muscular movement, etc., which may necessitate a rewinding of the bandage. Moreover, although a bandage comprising elastic warp strands of high twist yarn is more desirable than rubber reinforced warp strands in view of its particularly suitable substantially non-constrictive properties, such a bandage reflects a compromise between the desirable degree of elasticity of rubber and the non-constrictive properties of the high twist yarn.

Therefore, bandages which could provide the substantially high degree of elasticity of rubber warp strands together with the non-constrictive properties of high twist yarn warp strands would constitute an improvement in the art because such bandages would provide more freedom of muscular movement and more comfortable application while maintaining the function of elastic bandages.

However, even in combining a high twist yarn fabric with a layer of a solidified rubber solution such as rubber latex, the rubber layer interferes with the non-constrictive properties of the high twist yarn and otherwise the fabric is subject to narrowing and curling during tension. Moreover, a rubber coated fabric is otherwise undesirable in that when employed as a bandage the rubber layer interferes with free breathing through the bandage inducing perspiration to the area about which the bandage is applied.

Foam rubber layers have been employed in combination with bandage materials either as a detached combination of foam rubber and the bandage material or as a united combination of foam rubber layer cemented or glued to a non-elastic woven fabric with the cement or glue being interposed between the rubber and the fabric. Such bandages comprising foam rubber cemented to a non-elastic fabric are undesirable in that the cement or glue layer interferes with the evaporation of moisture through the bandage. The employment of foam rubber glued to an elastic bandage has otherwise been found to be undesirable because the cementing material between the rubber and the fabric has less elasticity than the rubber or the fabric and the bandage is subject to separation between the fabric and rubber layers upon fracture or breakage of the cement or glue. Moreover such elastic bandage-foam rubber combination suffers from narrowing of the elongated bandage and does not have the property of free breathing through the bandage.

In short, no combination of elastic fabric and foam rubber has heretofore provided for satisfactory results in the provision of a bandage possessing all the desirable features hereinabove set forth.

It is an object of the present invention to provide a foam rubber coated elastic bandage. It is another object of the invention to provide a foam rubber coated elastic bandage of improved elasticity. It is a further object of the present invention to provide a foam rubber coated elastic bandage having improved elasticity, freedom from slippage, free breathing and non-constrictive properties. Other objects and advantages of the present invention will become apparent from the description hereinafter following and the drawings forming a part hereof, in which:

FIGURE 1 illustrates a schematic view of a bandage material,

FIGURE 2 illustrates a perspective schematic view of a bandage according to this invention, and FIGURE 3 illustrates an enlarged cross-sectional view of FIG. 1.

According to the invention it is contemplated to provide a foam rubber coated elastic bandage having a layer of woven elastic fabric wherein the fabric is rendered longitudinally elastic by means of elastic warp yarns such as high twist cotton yarns, or elastic synthetic yarns, which are well known to the art, and the elastic fabric being bonded to a particular foam rubber layer adapted to provide for improved elasticity, free breathing to enhance the evaporation of moisture from areas underlying the bandage, freedom from slippage when wound either about itself or to another surface, and which possesses optimum elasticity without undesirable constriction.

Regarding FIGURE 1, the bandage comprises an elastic fabric strip 1 composed of elastic warp yarns 2 and preferably non-elastic filler or weft yarns 3, although it is contemplated that the weft yarns 3 may be also elastic, or a combination of elastic and non-elastic yarns. While the warp yarns 2 are generally elastic yarns of high twist cotton, or of elastic synthetic material such as nylon in the form of filaments in plied or non-plied condition, it is preferred to employ elastic cotton having a twist count of from at least 48 to about 52 turns per inch.

The foam rubber to be applied to the elastic fabric as a layer thereon is prepared by processing liquid latex by whipping to desirable consistency in known manner, and then such foam rubber is directly applied to the elastic material as a layer, so that the composite material comprises a layer of elastic fabric 4 and a layer of foam rubber 5 as shown by FIGURE 2.

However, it has been now found that in order to provide for all the abovementioned desirable bandage characteristics, it is essential that the foam rubber be applied directly to the fabric without any other bonding agent so that there is a direct contact of the foam rubber with the elastic cloth, and that the foam rubber layer has a critically controlled thickness of either not more than twice the thickness of the fabric or at most such thickness of foam rubber as will permit the elasticity of the coated bandage to be carried primarily and more than 50 percent by the warp yarns and to a lesser degree by the foam rubber. Also the thickness is of such magnitude as will permit the easy passage of air through the bandage, and have not more than about 6 percent narrowing of the bandage due to the rubber coating.

In the bonding of the foam rubber onto the fabric, the foam rubber will penetrate partially through the fabric material in such manner as shown by FIGURE 3 where the foam rubber layer 6 is shown to penetrate approximately half-way through the fabric layer 7, whereby not only an optimum bond is established, but the rubber is prevented from tearing even upon excessive stretching. It has been established in the development of this invention that a substantially thin foam rubber layer has a greater elastic limit due to the intimate cooperation between such thin foam rubber layer and the elastic fabric layer so long as the thin rubber layer has substantially no independent stretch apart from the combinatory stretch. With a rubber layer thickness beyond a critical thickness, the thick rubber, because of the independence of stretch substantially at the outer rubber surface areas, the rubber is apt to tear upon certain stretch tensions and otherwise interferes with the free access of air through the bandage.

Moreover, with the critical requirement that the rubber has a thickness such as will not permit substantially independent stretch, a new function is provided in combination with the elastic fabric. This new function is the increased elasticity imparted to the coated fabric. Since rubber generally has a greater elasticity than elastic fabric yarns, the elastic combination of fabric and rubber is such that only some of the rubber compression is imparted to the coated fabric and only to a minor degree in comparison to the compression of the elastic cotton yarns, whereby while the yarns primarily carry the compression of the composite bandage and without constriction over the area to which applied.

This combination of dual elastic function becomes especially advantageous under humid conditions where the cotton fabric would ordinarily lose some of its elasticity and compression, and where the minor elastic component of the rubber is just sufficient to recover, or to maintain the elasticity and compression of the yarn so that the bandage at all times retains its elasticity and compression.

In addition to the several advantages hereinbefore described, the bandage of the present invention imparts additive radical compression to a limb or other area to which the bandage is applied due to the function of the foam rubber. Otherwise stated, while an ordinary elastic compression bandage provides for resultant radial compression components as a function of the elasticity of the bandage, the bandage of the present invention provides for such resultant compression component in addition to a direct compression by the force of the compressed rubber in its tendency to assume its non-compressed condition. Attempts have been made to employ such foam rubber as a bandage component to provide for such direct compression as a function of foam rubber, but such attempts did not provide an entirely satisfactory bandage because the rubber as heretofore applied in a substantially thick layer produced a curling and narrowing effect together with very limited elasticity. To overcome these disadvantages, the foam rubber layer was slit along its length to provide a plurality of parallel rubber strips throughout the length of the bandage, the reason being that such narrow rubber strips would independently attenuate during stretching and reduce the narrowing of the composite bandage. With the present invention, the resort to slitting or otherwise modifying the foam layer is unnecessary so long as the thickness of the foam rubber is of a critically controlled thickness preferably less than the thickness of the woven fabric and is effectively bonded into the fabric layer so as to provide for combinatory elasticity and with substantially no independent elasticity of the rubber.

The fabric may or may not be coated with water repellent means 8 and a surface of the composite bandage may be coated with an adhesive. Also a foam rubber surface may be lightly coated with an adhesive 9. It has been established that the adhesive layer 9 may be of a substance different from the rubber composition of the layer 6, or the rubber surface may be merely heat treated for a short period whereby the consistency of the rubber on the surface is altered and such rubber surface becomes slightly tacky, which provides for adequate adhesion without substantially impairing the free breathing and other desirable properties of the bandage.

Other modifications of the invention herein described are contemplated within the scope of the appended claim.

What I claim is:

An elastic bandage comprising in combination a layer of woven elastic fabric and a layer of foam rubber, said foam rubber layer being bonded directly to said fabric layer and penetrating partly through the thickness of said fabric layer, said foam rubber layer including the penetrating portion thereof having a thickness of not more than twice the thickness of the elastic fabric layer, said elastic fabric layer being partly embedded in said foam rubber layer, wherein a layer of the bandage between the outer surface of the fabric layer and the outer surface of the foam rubber layer is a bond layer consisting of a combination of foam rubber and woven elastic fabric, said bond layer comprising the major portion of the thickness of said foam rubber layer.

References Cited in the file of this patent

UNITED STATES PATENTS

| | | |
|---|---|---|
| 2,118,101 | Nollau et al. | May 24, 1938 |
| 2,629,678 | Thompson et al. | Feb. 24, 1953 |
| 2,687,723 | Stern | Aug. 31, 1954 |
| 2,740,402 | Scholl | Apr. 3, 1956 |
| 2,787,266 | Scholl | Apr. 2, 1957 |